J. HECHT.
CULTIVATOR.
APPLICATION FILED MAR. 7, 1912.

1,092,990.

Patented Apr. 14, 1914.

2 SHEETS—SHEET 1.

WITNESSES
Howard D. Orr
H. H. Riley

Joseph Hecht, INVENTOR,
BY E. G. Siggers
ATTORNEY

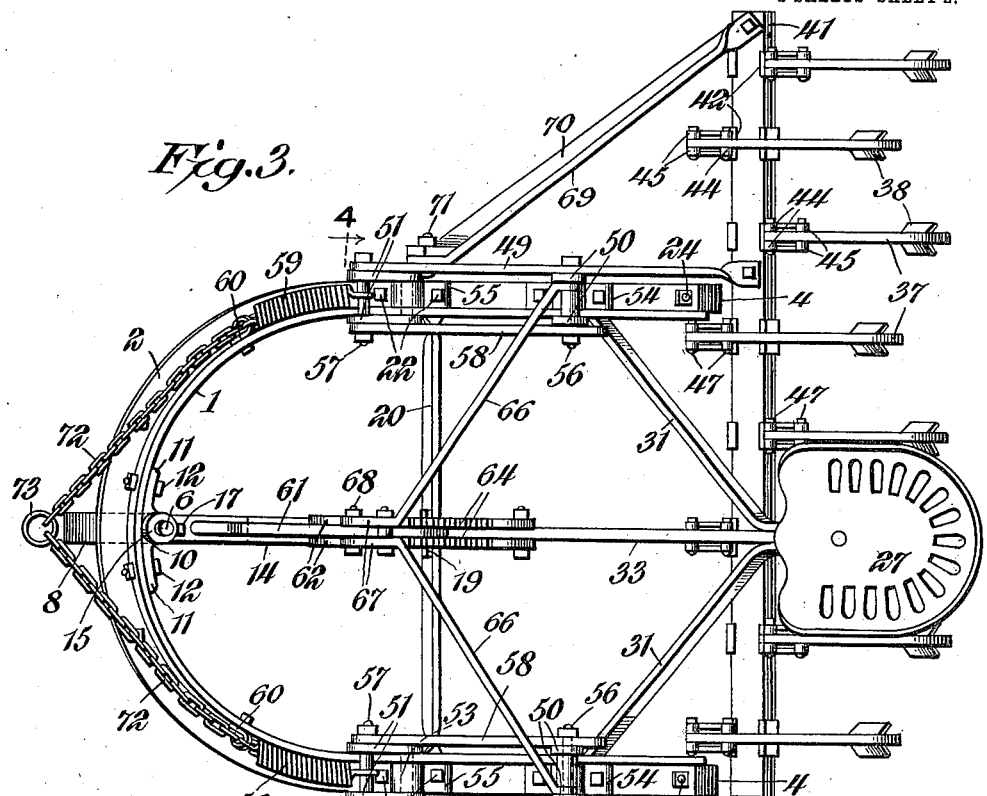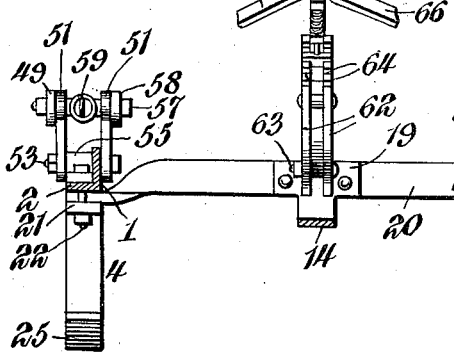

UNITED STATES PATENT OFFICE.

JOSEPH HECHT, OF RIVERSIDE, CALIFORNIA.

CULTIVATOR.

1,092,990.  Specification of Letters Patent.  Patented Apr. 14, 1914.

Application filed March 7, 1912. Serial No. 682,118.

*To all whom it may concern:*

Be it known that I, JOSEPH HECHT, a citizen of the United States, residing at Riverside, in the county of Riverside and State of California, have invented a new and useful Cultivator, of which the following is a specification.

The invention relates to improvements in cultivators.

The object of the present invention is to improve the construction of cultivators, and to provide a simple, efficient and comparatively inexpensive riding cultivator, adapted for general farming, but designed particularly for the cultivation of orchards and small pieces of ground, where it is impossible to use an ordinary cultivator having a tongue or pole.

A further object of the invention is to provide a cultivator of this character, having means for enabling a team to be hitched at the front of the frame of the cultivator, and equipped with rear supporting runners, adapted to eliminate the tilting incident to wheeled cultivators and to produce a more uniform cultivation of the soil, and capable of also preventing the cultivator from running onto the horses when the cultivator teeth are out of the ground.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
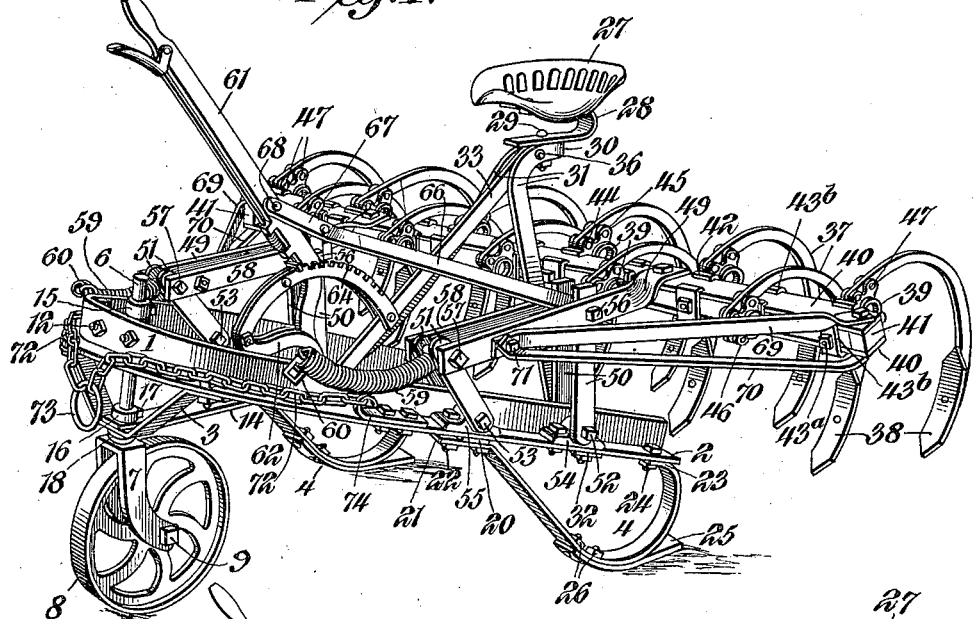
Figure 2:
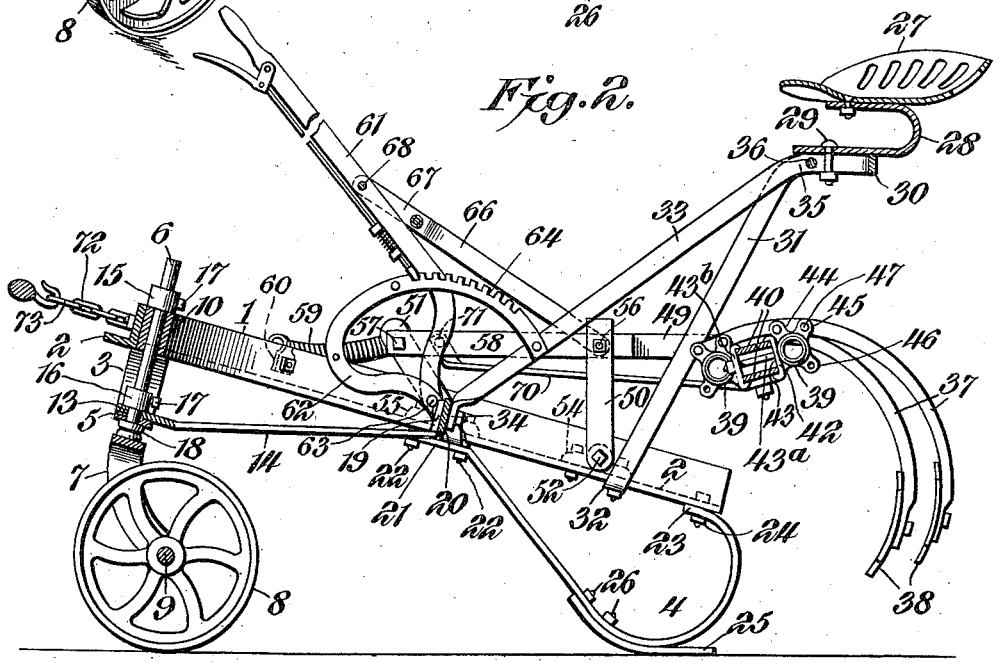

In the drawings:—Figure 1 is a perspective view of a cultivator, constructed in accordance with this invention. Fig. 2 is a central longitudinal sectional view of the same. Fig. 3 is a plan view. Fig. 4 is a transverse sectional view on the line 4—4 of Fig. 3. Fig. 5 is a detail sectional view, illustrating another arrangement of shovel standard.

Like numerals of reference designate corresponding parts in all the figures of the drawings.

In the accompanying drawings in which is illustrated the preferred embodiment of the invention, the cultivator is provided with an open approximately U-shaped supporting frame 1, arranged at an inclination and extending downwardly from front to rear, and composed of spaced sides and a curved front transversely disposed connecting portion. The inclined frame 1 of the cultivator is preferably constructed of angle iron, or other suitable material, providing at the lower edge of the frame an outwardly extending longitudinal flange 2, forming convenient means for the attachment of a bearing bracket 3 and rear runners 4. The bearing bracket, which is transversely disposed, consists of a bottom portion and inclined upwardly diverging sides, bolted, or otherwise secured at their upper terminals to the lower face of the flange 2 at opposite sides of the center of the front transverse connection portion of the frame 1. The bearing bracket is provided at the bottom with an opening 5 for a stem 6 of a fork 7, in which is mounted a front caster wheel 8. The sides of the fork are provided with suitable bearings for the shaft or axle 9 of the caster wheel, and the stem 6, which is arranged at a slight inclination, extends through an opening in an upper bearing 10, provided with laterally extending attaching flanges or portions 11, secured by bolts 12, or other suitable fastening means to the inner face of the front transverse portion of the frame 1. The stem also passes through a front opening 13 of a central longitudinal brace 14, and it is equipped with upper and lower set collars 15 and 16, provided with set screws 17 for engaging the stand and arranged at the upper face or edge of the bearing 10 and the upper face of the front end of the longitudinal brace 14. The bottom of the bracket 3 and the front end of the brace 14 are arranged between the set collar 16 and a lower shoulder 18, which is formed by a fixed collar or enlargement of the stem 6. The body portion of the brace 14 is arranged in approximately a horizontal position, and its front end has a slight angular bend and its rear end 19 is bent upwardly at nearly a right angle and is secured to the center of a transverse connecting bar 20, extending across the space between the sides of the frame 1 and provided at its ends with quarter bends to arrange its terminals flat against the flange 2, and its body portion edgewise with the side faces thereof in an upright position.

The runners 4 consist of inclined front portions and curved approximately semicircular rear portions. The front terminals 21 of the runners are secured to the lower face of the flange 2 of the frame 1 at the ends of the transverse bar 20 by bolts 22, and the inclined portions extend downwardly and rearwardly from the cultivator frame 1 to the curved portions, which extend upwardly and rearwardly from the inclined portions to the rear ends of the sides of the frame 1. The rear terminals 23 of the runners are secured to the lower face of the bottom flange 2 by bolts 24. The runners are equipped at the bottom with shoes 25, secured at their front ends by bolts 26 to the inclined portions of the runners, and having horizontal rear portions extending rearwardly from the bottom of the runners and presenting flat lower faces to the soil. The shoes are detachable and protect the runners from wear and are adapted to be readily renewed when worn.

The cultivator is equipped with a seat 27, provided with an approximately U-shaped supporting spring 28, composed of upper and lower horizontal portions and a rear connecting portion, the upper portion being secured to the lower face of the seat and the lower portion being adjustably secured by a vertical bolt 29 to a horizontal approximately U-shaped loop or bend 30, connecting the upper terminals of inclined side standards 31. The side standards 31 have their lower terminals 32 extended beneath the bottom flange 2 of the frame and secured to the lower face of the same, and the said standards 31 converge upwardly and rearwardly and are formed integral with the horizontal loop or bend 30. A central inclined standard 33, which is secured at its lower end 34 to the transverse bar 20, has its upper end 35 arranged between the sides of the horizontal loop or bend 30 and secured to the same by a transverse bolt 36, piercing the sides of the loop or bend 30 and the upper end 35 of the central standard 33. The central standard 33 extends upwardly and rearwardly from the center of the transverse bar 20 to a point beneath the lower portion of the spring of the seat, and it coöperates with the inclined side standards to form a rigid tripod support for the spring of the seat.

The standards 37 of the teeth or shovels 38 of the cultivator are curved upwardly and forwardly, and are connected with a shiftable transversely disposed tooth carrying beam by brackets 39, adapted to be arranged alternately in advance and in rear of the transverse cultivator beam to stagger the shovels 38, but they may all be secured to the front or the rear of the tooth carrying beam to arrange the teeth in the same transverse plane. The tooth carrying beam is composed of spaced upper and lower transversely disposed metallic bars 40, maintained in spaced relation by interposed blocks 41, secured to the bars 40 by suitable fastening devices, which connect the said bars 40 with each other. The tooth carrying beam may, however, be of any other preferred construction, and each of the brackets 39 is composed of spaced sides and a connecting transverse portion 42, provided in its outer face with a recess 43, adapted to receive the beam and forming projecting flanges for engaging the outer faces of the upper and lower bars 40, as clearly shown in Fig. 5 of the drawings. The transverse portion is pierced by a bolt 43$^a$, extending through the space between the upper and lower bars 40 and passing through a plate 43$^b$, provided with a recess receiving the beam and engaging the upper and lower bars 40 at points opposite the transverse portion 43 of the bracket 39. The spaced sides of the bracket 39 have central circular openings to lighten the same, and are provided with lugs or ears 44, 45 and 46, located at the upper corners of the sides and the lower outer corners of the same, and adapted to receive transverse fastening devices 47, preferably consisting of bolts, and adapted to permit either the curved standards 37 or straight standards 48 to be secured to the brackets. The curved standards have their upper ends arranged between the top ears or lugs 44 and 45, as clearly shown in Fig. 2 of the drawings, and the straight standards 48 are arranged at the outer portions of the brackets between the lugs or ears 45 and 46. Although the curved standards 37 are shown of a rigid character, it will be readily understood that curved spring teeth or standards may also be secured to the brackets 39.

No claim is made in the present application to the means for securing the teeth to the tooth carrying beam.

The transverse tooth carrying beam is provided at opposite sides of its center with forwardly extending arms 49, located above the sides of the inclined supporting frame 1, and pivotally connected at points intermediate of their ends to the upper terminals of rear oscillatory links 50 and at their front ends to the upper terminals of front oscillatory links 51. The rear and front links 50 and 51 are arranged in pairs with their lower ends at the inner and outer faces of the sides of the frame, and they are connected to the same by transverse pivot bolts 52 and 53, arranged in bearings 54 and 55 and piercing the upwardly extending flange of the sides of the frame 1. The upper ends of the links 50 and 51 are connected to the arms 49 by transverse pivot bolts 56 and 57, which also pierce the front and rear terminals of bracing bars or links 58, arranged in parallelism with the arms 49 at the upper ends of the inner members of the pairs of links 50 and 51. The links 50 are of greater length than the links 51, and when they are arranged in a vertical position, as illustrated in Figs. 1 and 2, the front links are arranged at an inclination and extend upwardly and forwardly.

The arms 49 of the transverse tooth carrying beam are in a horizontal position with the teeth or shovels elevated out of the ground. A rearward movement of the tooth carrying beam from this position oscillates the links 50 and 51, and the upper pivots thereof swing through different arcs, the upper pivots 56 of the rear links moving downwardly and rearwardly, while the upper pivots of the front links move rearwardly and upwardly from the said position shown in Fig. 1, and then downwardly. The arms 49 are carried rearwardly and downwardly by the rear links, and are also oscillated on their upper pivots thereof to swing the teeth downwardly, which movement is in addition to the bodily arcuate movement of the arms through the oscillation of the rear links. These combined movements enable the teeth or shovels to be quickly raised and lowered, and the upward movement is assisted by counter-balancing coiled springs 59, located at opposite sides of the frame 1 and extending longitudinally thereof and connected at their front ends to the same, and at their rear ends to the upper pivots 57 of the front links 51, whereby when the teeth or shovels are lowered, the coiled springs 59 are placed under tension and assist the operator in raising the shiftable support, formed by the tooth carrying beam. The frame is provided at opposite sides with plates 60, having terminal hooks to which the front ends of the coiled springs are secured.

The transverse tooth carrying beam is shifted by means of a centrally arranged operating lever 61, extending upwardly from a bracket 62, which is centrally secured to the transverse bar 20. The bracket 62 is composed of two sides, spaced apart to receive the lever 61, which is pivoted at its lower end between the sides of the bracket by a bolt 63. The sides of the bracket 62 extend upwardly and forwardly and are provided with arcuate top portions, disposed longitudinally of the cultivator and secured at their rear ends to the side faces of the central seat standard 33, and provided at their upper edges with notches 64, adapted to be engaged by a spring actuated dog or detent for securing the operating lever 61 and the teeth or shovels 38 in their adjustment. The spring actuated dog or detent is connected with a latch lever, mounted on the lever 61 and arranged adjacent to the upper end portion thereof. The operating lever 61 is connected with the upper pivots 56 of the rear links by rearwardly diverging link bars 66, having angularly bent front terminals 67 arranged at opposite sides of the lever 61 and connected by transverse bolts 68, one of which pierces the lever 61 and forms a pivot for connecting the link bars 66 to the lever. The operating lever 61 is adapted to be oscillated to raise and lower the tooth carrying beam, which is braced at its ends by angularly disposed bars 69 and 70, arranged in pairs and secured at their rear terminals to the outer faces of the upper and lower bars 40 of the beam, and connected at their front terminals to the arms 49 by bolts 71.

The doubletree or other whiffletree of the team is connected with the frame of the cultivator by means of side chains 72, connected together at their front ends to a ring 73 and extending rearwardly along the upper face of the flange 2 and supported by and secured to the same at opposite sides of the frame 1 by means of plates 74, bolted to the flange 2 and provided with hooks for engaging the links of the chains 72. The chains form flexible connections between the doubletree and the sides of the inclined frame and extending downwardly from the doubletree along the line of draft, when the teeth or shovels of the cultivator are in the soil. As the team is hitched directly at the front of the frame of the cultivator, it is possible to cultivate the soil in an orchard close to the trees and small pieces of ground where it is impossible to employ a cultivator having a tongue or pole, and as runners are employed for supporting the cultivator frame at the back thereof, there is no danger of the cultivator running onto the horses when the shovels are out of the ground. The inclined frame besides being in the line of draft also has its front portion elevated to clear the legs of the team, and has its lower portion arranged close to the ground directly in advance of the teeth or shovels when the latter are lowered. By this arrangement of the frame and the runners, the tilting, which occurs in two or three wheeled cultivators, is not present and the more uniform cultivation of the soil is effected, as the teeth at one side will not dig deeper into the ground than the teeth at the other side.

What is claimed is:—

1. A cultivator including a supporting frame arranged at an inclination and extending downwardly and rearwardly, a centrally arranged caster wheel supporting the front of the frame, runners secured to the rear portion of the frame at opposite sides thereof, and a transverse tooth carrying beam located at the back of the supporting frame, and means connected with the tooth carrying beam and with the supporting frame and extending over the rear portion of the latter for raising and lowering the said beam.

2. A cultivator including an approximately U-shaped frame set at an inclination and extending downwardly and rearwardly and composed of spaced sides and a front transverse connecting portion, a caster wheel supporting the front portion of the frame, runners connected with the sides of the frame at the rear portions of the same, and cultivating devices carried by the frame and operating in rear thereof.

3. A cultivator including an open frame set at an inclination and composed of spaced sides and a transverse connecting portion, a caster wheel supporting the front of the frame, runners supporting the rear of the frame and secured to the side thereof, cultivating devices carried by the frame, and flexible connections extending along the sides of the frame and connected at their rear ends to the same and provided at their front ends with means for connecting them to a whiffletree.

4. A cultivator including an open frame set at an inclination and composed of spaced sides and a transverse connecting portion, means for supporting the frame at the front and rear of the same, cultivating devices carried by the frame, plates secured to the frame at opposite sides thereof and provided with hooks, and side chains adjustably connected at their rear ends to the said hooks and provided at their front ends with means for connecting them to a whiffletree.

5. A cultivator including an approximately U-shaped frame set at an inclination and composed of spaced sides and a connecting front portion and provided with exteriorly projecting longitudinal flanges, means for supporting the frame at the front and rear thereof, cultivating devices carried by the frame, and side chains arranged at the front portion of the frame and extending along and supported by the longitudinal flanges and secured at their rear ends to the frame and provided at their front ends with means for connecting them to a whiffletree.

6. A tongueless cultivator including an approximately U-shaped frame composed of spaced sides and a transverse curved connecting portion, a caster wheel mounted at the front of said transverse curved portion, runners secured to the rear ends of the sides of said frame, flexible connections extending along the outer sides of the frame and connected at their rear ends to the frame and provided at their front ends with means for connecting the cultivator to a whiffletree, a transverse tooth-carrying beam located at the back of the frame and spaced therefrom, means for pivotally connecting the beam to the frame in advance of the rear end of the latter, and a seat mounted upon the frame in rear of the said pivotal connection of the beam to the frame.

7. A cultivator including a frame having spaced sides, means for supporting the front of the frame, runners secured to the sides of the frame and supporting the rear end thereof and consisting of downwardly and rearwardly inclined front portions, and curved rear portions extending from the bottom of the inclined portions to the sides of the frame, shoes secured to the runners at the bottom thereof and projecting rearwardly from the said curved portions, and cultivating devices carried by the frame.

8. A cultivator including a frame set at an inclination and extending downwardly and rearwardly, a caster wheel supporting the front of the frame, runners secured to the sides of the frame at the rear ends of the same, a transverse tooth carrying beam located at the back of the frame and having forwardly extending arms, links connecting the arms with the sides of the frame, and operating mechanism for oscillating the links to raise and lower the tooth carrying beam.

9. A cultivator including a supporting frame, a transversely disposed tooth carrying beam located at the back of the supporting frame and having arms extending forwardly over the same, front and rear links connecting the arms with the frame, said links being of different lengths and producing a pivotal and arcuate movement of the beam to swing the latter backwardly and forwardly and raise and lower the same, and operating mechanism for oscillating the links.

10. A cultivator including a supporting frame, a transversely disposed tooth carrying beam located at the back of the supporting frame and having arms extending forwardly over the same, front and rear links pivoted at their lower ends to the supporting frame and extending upwardly therefrom and pivotally connected at their upper ends to the said arms, the front links being shorter than the rear links and adapted to cause the arms to swing on the pivots of the rear links simultaneously with the oscillatory movement of the latter, and means for oscillating the links.

11. A cultivator including a frame, front and rear links pivotally mounted on and extending upwardly from the frame and being of different lengths to swing through unequal arcs, a transverse tooth carrying beam located at the back of the frame and provided with arms extending forwardly over the frame and pivotally connected to the said links and having arcuate and pivotal movement, an operating lever arranged to swing longitudinally of the frame and located centrally thereof, and link bars connecting the operating lever with the rear links.

12. A cultivator including a frame having spaced sides, front and rear links arranged in pairs and extending upwardly from the sides of the frame, a transverse tooth carrying bar arranged at the back of the frame and provided with arms extending forwardly over the same and pivotally connected to the said links, an operating lever, and means for connecting the operating lever with the arms and the links.

13. A cultivator including a supporting frame, a transversely-disposed tooth-carrying beam located at the back of the supporting frame and having arms extending forwardly over the same, spaced links pivotally connecting the arms with the frame, coiled springs also connecting the arms with the frame in advance of the links, and an operating lever mounted on the frame and connected to the said arms of the beam in rear of the springs.

14. A cultivator including a frame having spaced sides and provided with a transverse connecting bar, laterally inclined side standards secured at their lower ends to the sides of the frame and connected at their upper ends, a central standard inclined upwardly and rearwardly and connected at its lower end to the transverse bar and at its upper end to the upper ends of the side standards, a substantially arcuate bracket secured at its rear end to the central standard and connected at its front end with the transverse bar, said bracket being provided with notches, a lever located in advance of the standards and pivotally connected with the bracket and having means for engaging the notches thereof, and a seat supported by the standards and located in rear of the lever.

15. A cultivator including a frame having spaced sides, upwardly extending oscillatory links mounted on the sides of the frame, a transverse tooth carrying beam located at the back of the frame and having arms extending forwardly over the same and pivotally connected with the links, coiled springs connected with the arms and with the sides of the frame, and an operating lever located between the sides of the frame and connected with the arms.

16. A cultivator including a frame composed of spaced sides and a front transverse connecting portion, a transverse bar connecting the sides of the frame in rear of the front transverse portion, a bearing bracket secured to and depending from the front transverse portion, a stem mounted in the bearing bracket and connected with the front transverse portion of the frame, means connected with the stem for supporting the front of the frame, a brace extending from the bearing bracket to the transverse bar, means for supporting the rear portions of the sides of the frame, and cultivating devices carried by the frame.

In testimony, that I claim the foregoing as my own, I have hereto affixed my signature in the presence of two witnesses.

JOSEPH HECHT.

Witnesses:
 JOHN ASKER,
 B. ROSCOE SHRYOCK.

---

Copies of this patent may be obtained for five cents each, by addressing the "Commissioner of Patents, Washington, D. C."